Dec. 22, 1931.    O. M. HOCH    1,837,435
CLUTCH OPERATING MECHANISM
Filed Dec. 22, 1928    3 Sheets-Sheet 1
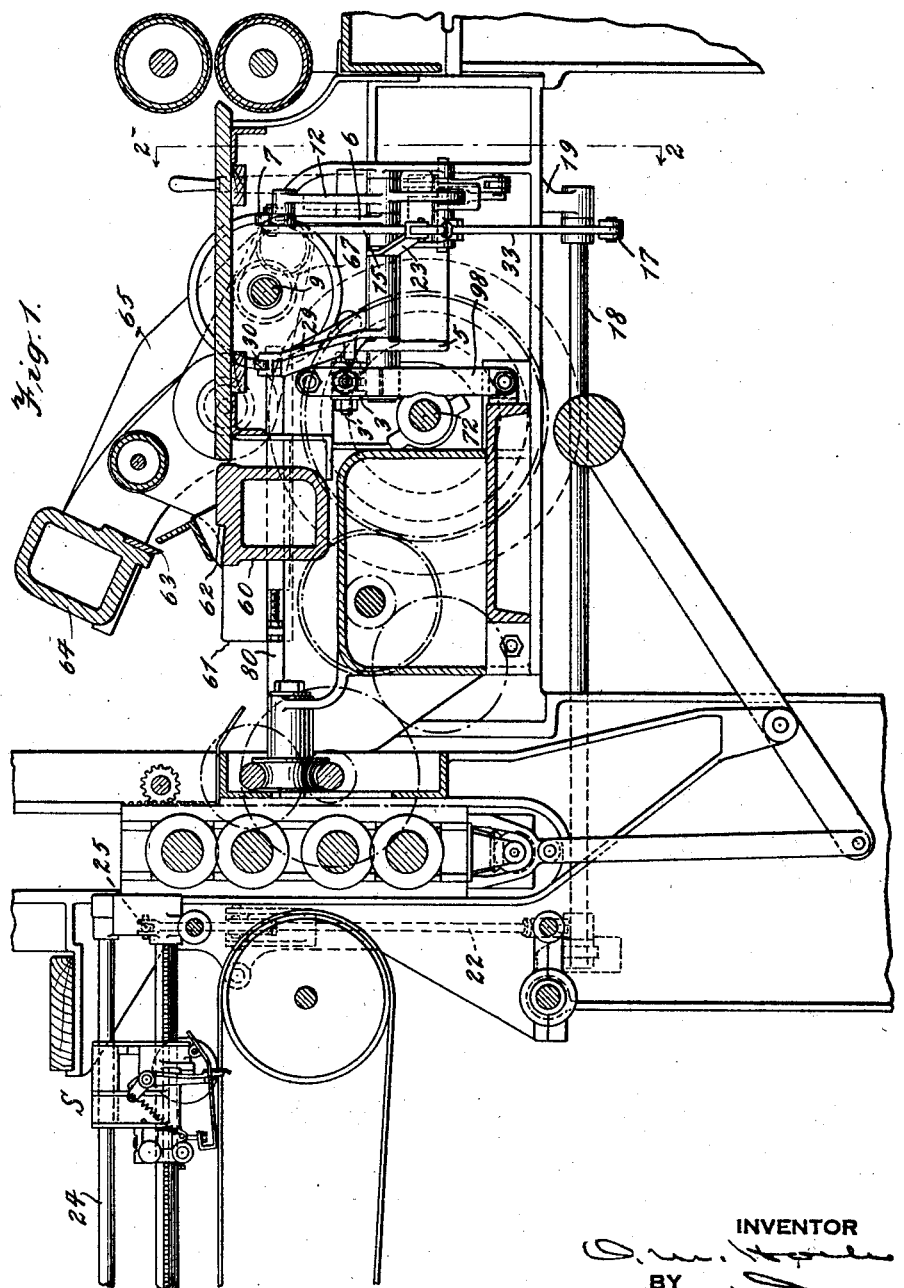
INVENTOR
BY
ATTORNEY

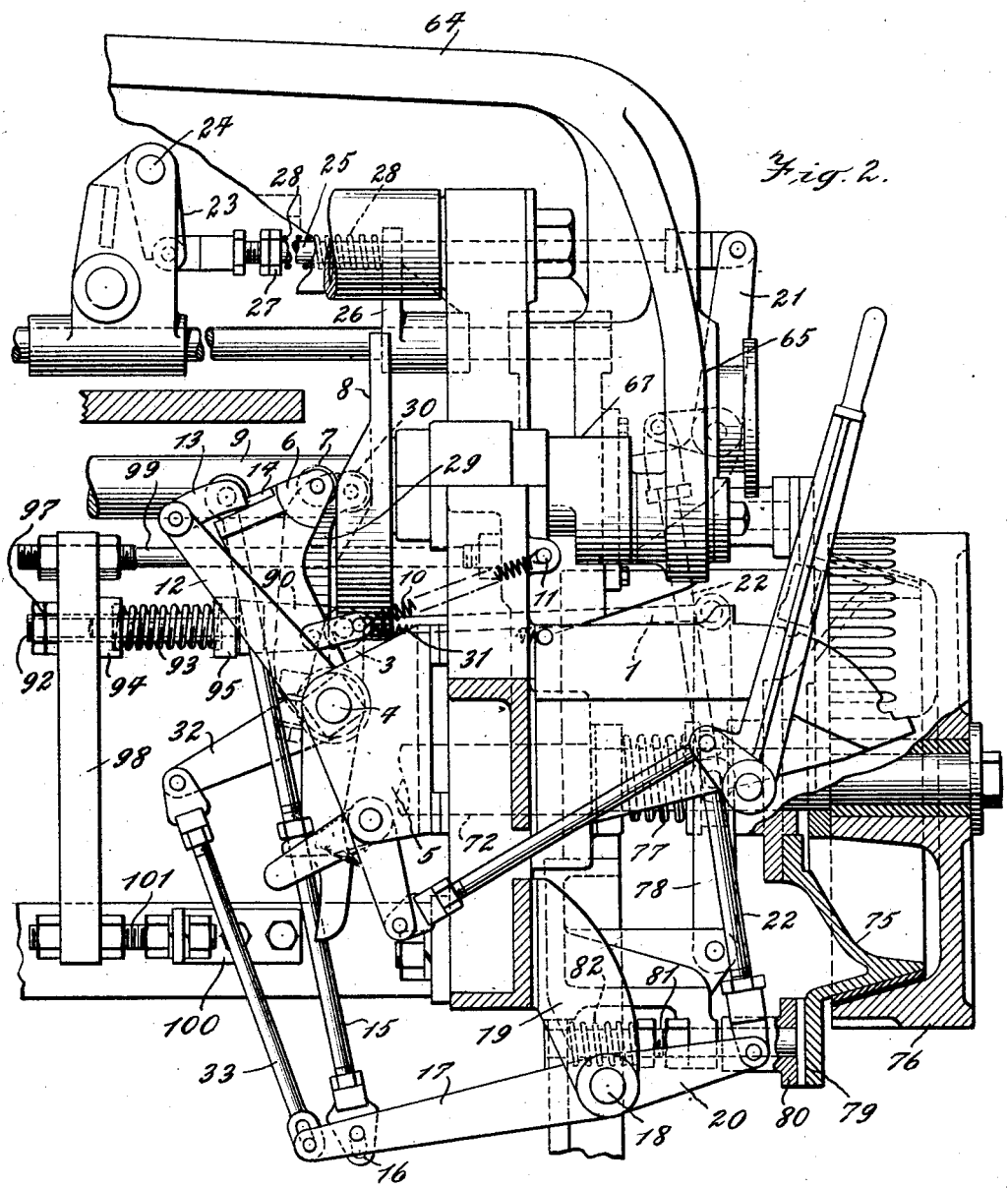

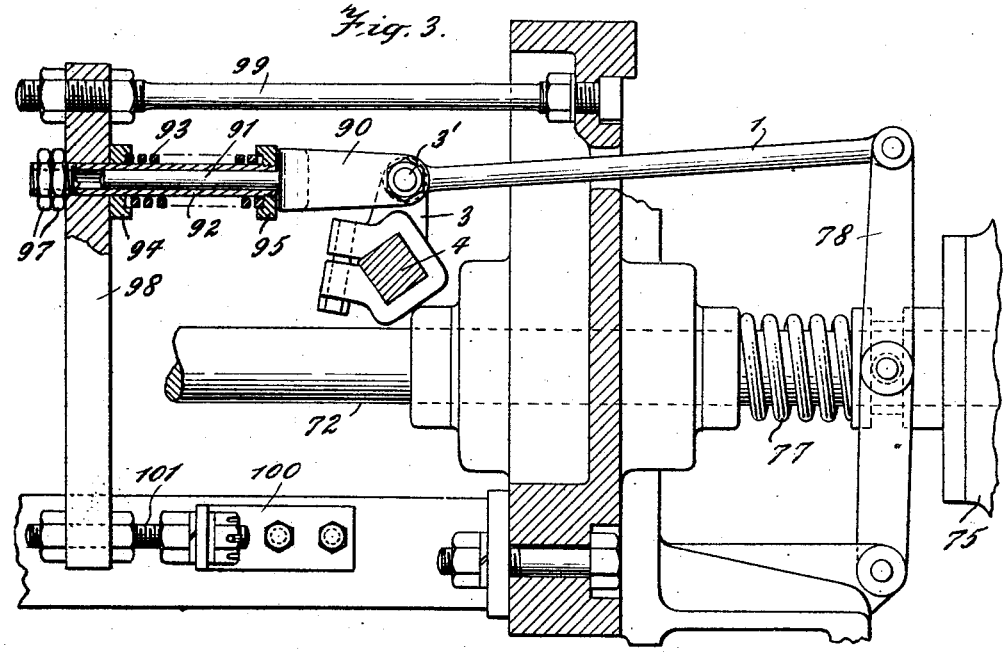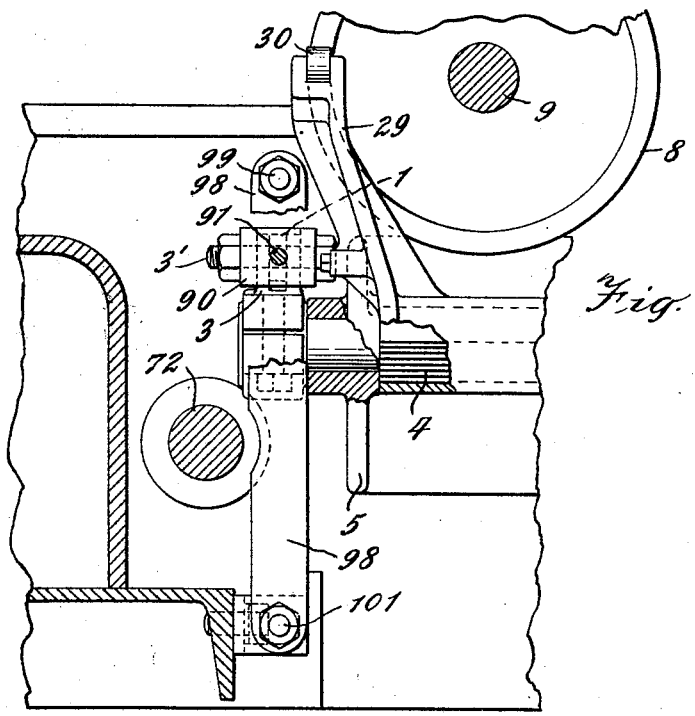

Patented Dec. 22, 1931

1,837,435

UNITED STATES PATENT OFFICE

OTTO M. HOCH, OF ROCHESTER, NEW YORK, ASSIGNOR TO M. D. KNOWLTON COMPANY, OF ROCHESTER, NEW YORK, A CORPORATION OF NEW YORK

CLUTCH OPERATING MECHANISM

Application filed December 22, 1928. Serial No. 327,766.

The invention relates to booster mechanism for clutches, such as commonly employed in shear mechanism and the like, in which the action is intermittent and the clutch has to be actuated in its operating relation in the shortest possible time. To this end, the invention comprises a compression spring mounted upon a rigid support and adapted to be compressed by an abutment connected to and movable with the clutch releasing mechanism so that, when the said spring is released, it will react through the abutment and its connection with the clutch releasing mechanism to boost or accelerate the clutch engaging operation.

The invention is illustrated in the accompanying drawings, in which:—

Fig. 1 is a partial longitudinal sectional elevation of a shearing machine including the invention.

Fig. 2 is an enlarged vertical section on line 2—2 of Fig. 1.

Fig. 3 is a fragmentary sectional elevation showing the details of the booster spring mechanism.

Fig. 4 is a fragmentary sectional elevation showing the relation of the clutch controlling mechanism to the booster.

As exemplified in the drawings, the invention is applied to shear mechanism of the type disclosed in the patent to Hawkins No. 1,321,207, dated November 11, 1919, which operates to cut predetermined lengths from a web of continuously moving material, the operation of the cutting means being intermittent and controlled by an adjustable trip mechanism actuated by the advance edge of the web to be cut. It will be understood, however, that the invention is not limited to use with this particular type of machine, but is applicable to all machines involving a clutch which is engaged and released at predetermined intervals and in the engaging movement of which the greatest possible speed is desired.

As described in the Hawkins patent aforesaid, the machine involves a lower cutter bar 60 extending transversely of the machine and carrying a shear blade 62, with which co-operates the upper shear blade 63 carried by a swinging or oscillating frame 64, the bar 60 and the oscillating frame 64 being carried in frame members 61, which are mounted for reciprocating motion on guides 80 formed on the bed of the machine. Reciprocation of both cutter members and the oscillation of the upper cutter frame is effected by a transversely extending shaft 9 having at its opposite ends crank arms 67 which are connected directly to the ends of the arms 65 of the upper cutter frame. The shaft 9 in turn is actuated through suitable gearing (not shown) from a drive shaft 72, the rotation of which latter is controlled by a friction clutch, and the operation of the clutch being controlled by the sheet trip mechanism.

The friction clutch, which is of the cone type, comprises the members 75 and 76, the member 76, which constitutes the driving member, being loosely mounted on the shaft to rotate freely thereon, and the member 75 being keyed to the shaft for sliding movement thereon and being normally forced into clutching engagement with the member 76 by means of a spring 77 surrounding the shaft. The movement of the sliding member 75 to and from its position of clutching engagement with the member 76 is controlled by means which, aside from those involving the present invention to be hereinafter particularly referred to, are substantially the same as those of the aforesaid Hawkins patent. Such means comprises a clutch lever 78 pivoted at its lower end to the machine frame and having the usual pin and collar connection intermediate of its ends with the clutch member 75 and at its upper end having pivotal connection with one end of a clutch rod 1, which latter at its opposite end is pivoted to an arm 3 secured to a shaft 4 supported in a bracket 5 carried by the machine frame. Mounted loosely on the shaft 4 is a cam lever 6 which carries a roller 7 at its upper end, which roller is adapted to cooperate with a cam 8 on the shaft 9, which is provided with a high and low portion, as shown in Fig. 2 of the drawings. This cam roller is normally retained in engagement with the surface of the cam by a spring 10, which is secured to the cam lever and to a stationary part of the machine at 11. An arm 12 is secured to the shaft 4 and carries at its upper end a pivoted pawl 13, which is arranged to engage wear block 14 on the cam lever 6, which pawl is adapted to be moved out of engagement with the wear block 14 by a rod 15 which is secured to the pawl and has a lost motion connection at 16 with an arm 17 rigidly supported on the shaft 18, which shaft is mounted in a suitable bracket 19 on the frame of the machine. A second arm 20 is fixed to shaft 18 and is connected to a bell crank lever 21 by a connecting link 22. This lever 21 is connected through a rod 25 to a crank arm 23, which is mounted rigidly on an oscillatory shaft 24 supported in suitable bearings and passing through the casing of the trip device S. The rod 25 passes through a bracket 26 and is provided with a collar 27, between which collar and bracket a coil spring 28 is mounted, which spring serves, when released, to move the rod 25 and, through the connecting elements, lifts the pawl 13 out of engagement with the wear block 14 and permits the clutch members to be engaged so that the shear mechanism will be actuated; the normal engagement of the clutch members being effected by the movement of clutch member 75 under the influence of spring 77 into engagement with the clutch member 76.

In order that the parts may be reset and the spring 28 again placed in compression, a cam lever 29 is loosely mounted on the shaft 4 and is provided with a roller 30, which is normally maintained in engagement with the face of cam 8 by a spring 31. Rigid with and extending in angular relation to the cam lever 29 is an arm 32, which is connected, by a lost motion connection through a link 33, with the arm 17. Thus, when the cam 8 is rotated after the clutch members have been engaged, as previously described, the riding of the roller 30 on the high portion of the cam 8 will cause the downward movement of the link 33 and the consequent re-engagement of the pawl 13 with the wear block 14 and the placing of the spring 28 under compression, so that it will be ready for a subsequent operation.

The sheet trip shown for automatically controlling the operation of the shear mechanism is of the type illustrated and described in the patent to Hoch No. 1,296,803, of March 11, 1919. This sheet trip, which is herein designated generally by the reference character S, is adapted to be actuated by the forward edge of the moving web of material to effect operation of the shear mechanism by causing engagement of the clutch members.

In the operation of the machine, the shaft 9 makes one complete revolution for each shearing action and, at the completion of this revolution, the roller 7 on lever 6 riding up the high portion of the cam rocks said lever 6, which, through pawl 13 and arm 12, rocks the shaft 4 and its arm 3 to thereby retract, through the connections 1 and 78, the movable clutch member 75 from engagement with the clutch member 76. In order to stop the machine promptly, the movable clutch member is provided with a braking face 79, which is adapted to be brought into engagement with a brake ring 80, which latter is secured to the ends of rods 81 slidably mounted in the machine frame and provided with cushioning springs 82.

As hereinbefore stated, it is desirable in machines of this type to effect a rapid engagement of the members of the clutch when the shearing operation is to be initiated, and it has been found that, because of the heavy drag put upon the clutch spring 77, the movement of clutch member 75 may be more or less sluggish. The present invention is designed to obviate this difficulty and to insure a rapid and effective movement of the clutch member 75 into engagement with its mating clutch member 76 immediately after the sheet trip has operated to effect the operation of the mechanism which holds the movable clutch member in retracted position.

As illustrated in Figs. 3 and 4, the shaft 4 which carries certain of the clutch controlling levers, is square in cross section, except those portions engaging the loosely mounted parts 6 and 29 and the end bearings, in order to effect a firm connection with the hub section of those levers which are fixedly attached thereto. The lever arm 3, which is effective in retracting the movable clutch member 75, is of the form shown in Figs. 3 and 4 with a square hub section clamped to the shaft 4. In the top of the lever arm 3 is a bolt 3', which connects with the pull rod 1 and also serves as a connection between the arm 3 and an abutment 90, one end of which latter is provided with a clevis which straddles the arm 3 and the other end of which is provided with a plain face beyond which extends a pin or rod 91. The pin 91 engages a sleeve 92 slidably mounted in a bar 98, which latter is adjustably secured to the frame of the machine by means of a spacing bar 99 at one end and a threaded stud 101 at the other, the stud 101 being mounted in a bracket 100 bolted to one of the girders of the machine frame, and the adjustment of the bar 98 being effected by suitable set nuts on the rod 99 and the stud 101, as clearly shown in Fig. 3. The sleeve 92 is provided with a threaded cap 95 on its inner end and with set nuts 97 on its outer end, so that the said sleeve is slidable in the opening in the bar 98 in which it is mounted. Surrounding the sleeve 92 is a helical spring 93, which is confined between the member 95 and a similar member 94, which latter loosely surrounds the sleeve and abuts the face of bar 98. Preferably, the sleeve is adjusted so as to clear the face of the abutment 90, when the latter is in the position shown in Fig. 3, that is to say, when the members 75 and 76 of the clutch are in engagement. When, however, the shaft 4 is rocked to disengage the clutch member 75, the abutment 90 moves with the lever 3, which partakes of the rocking movement of the shaft 4, and the end face of the abutment engages the collar 95 on the sleeve 92 and moves the latter in a direction to compress the spring 93, thereby storing up energy which will be effective in accelerating the movement of shaft 4, together with lever arm 3 and the clutch member 75 connected therewith, when the trip mechanism releases the pawl 13, as hereinbefore explained. The reaction of the spring 93 forces the sleeve and the abutment 90 and with it lever 3, connecting rod 1 and rock lever 78 in a direction to materially supplement the action of the clutch sping 77, thereby greatly accelerating the speed of the cooperating engagement of the clutch member 75 with its mating member 76.

By this means, a very much prompter action of the clutch in starting is obtained and this action of the booster device in shifting the movable clutch member into operative engagement is proportional to the speed of the machine. At the higher speeds of operation, the braking action brought about by the engagement of the clutch member 75 with the brake ring 80 will not stop the machine as quickly as when the latter is operating at slower speeds, consequently the cam 8 rotates farther and causes the roller 7 carried by lever 6 to climb higher on the inclined surface of the cam, thus withdrawing the inner clutch member 75 a somewhat greater distance from its mating clutch member 76, thereby setting the brake tighter and also causing the lever arm 3 to move through a greater distance, which produces a corresponding movement of the sleeve 92 and a greater degree of compression of the booster spring 93, thereby storing up additional energy in said spring, which is effective to speed up the engagement of the movable clutch member at the beginning of the next operating cycle.

Conversely, when the shear is moving more slowly and the braking action will, therefore, stop the mechanism more quickly, the clutch member 75 is not withdrawn as far as when the machine is operating at higher speeds and, therefore, the cam 8 does not turn as far, so that the distance traversed by lever 3 is less and correspondingly the compression of the booster spring 93 will be less. This is in consonance with good practice, as not as much energy is required to be delivered by the booster spring to promptly return the clutch member 75 to engaging relation, as said clutch member and its operating parts do not have to move through a greater distance as in the case at the higher speeds of operation.

What I claim is:

1. Clutch operating mechanism including a spring for normally engaging the members of the clutch with each other, a cam actuated rock shaft, an arm thereon for releasing the clutch, an abutment on the arm, and a spring engaged by said abutment to be compressed by the clutch releasing movement of said arm and to operate as a booster in the clutch engaging operation when released.

2. Clutch operating mechanism including a spring for normally engaging the members of the clutch with each other, a cam actuated rock shaft, an arm thereon for releasing the clutch, an abutment pivoted to said arm, and a spring supported in the line of movement of said abutment to be compressed by the abutment in the clutch releasing movement of said arm and to react through the abutment when released to boost the clutch engaging operation.

3. Clutch operating mechanism including a cam actuated rock shaft, an arm thereon for releasing the clutch, an abutment pivoted to said arm and having a rod extension on its opposite end, a sleeve slidably mounted in a fixed support to receive said rod extension, and a helical spring surrounding said sleeve confined between the end of the sleeve and the fixed support; whereby clutch releasing movement of said arm will cause the abutment to compress said spring and the latter will react when released to boost the clutch engaging operation.

In testimony whereof I affix my signature.

OTTO M. HOCH.